(12) United States Patent
Lee (10) Patent No.: US 9,904,372 B2
(45) Date of Patent: Feb. 27, 2018

(54) METHOD BY WHICH EYEGLASS-TYPE DISPLAY DEVICE RECOGNIZES AND INPUTS MOVEMENT

(71) Applicant: MACRON CO., LTD., Seongnam-si, Gyeonggi-do (KR)

(72) Inventor: Kil-Jae Lee, Seongnam-si (KR)

(73) Assignee: MACRON CO., LTD., Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/027,174

(22) PCT Filed: Aug. 28, 2014

(86) PCT No.: PCT/KR2014/007993
§ 371 (c)(1),
(2) Date: Apr. 4, 2016

(87) PCT Pub. No.: WO2015/050322
PCT Pub. Date: Apr. 9, 2015

(65) Prior Publication Data
US 2016/0252966 A1 Sep. 1, 2016

(30) Foreign Application Priority Data

Oct. 4, 2013 (KR) ........................ 10-2013-0118251

(51) Int. Cl.
*G09G 5/00* (2006.01)
*G06F 3/01* (2006.01)
(Continued)

(52) U.S. Cl.
CPC ............ *G06F 3/017* (2013.01); *G06F 3/0304* (2013.01); *G06F 3/0482* (2013.01);
(Continued)

(58) Field of Classification Search
CPC ...... G06F 3/017; G06F 3/0486; G06F 3/0482; G06F 3/0304; G06F 3/04842;
(Continued)

(56) References Cited

U.S. PATENT DOCUMENTS 8,558,759 B1 * 10/2013 Prada Gomez ......... G06F 3/017
345/156
2007/0236476 A1 * 10/2007 Suzuki ................ G06F 3/04883
345/173

(Continued)

*Primary Examiner* — Rodney Amadiz
(74) *Attorney, Agent, or Firm* — William Park & Associates Ltd.

(57) ABSTRACT

Provided is a method of performing an input operation through motion recognition in a glasses-type display device, which is capable of controlling the glasses-type display device through the most natural and intuitive hand motion. The method of performing the input operation through motion recognition in the glasses-type display device includes: an image acquiring operation of acquiring sequential images by using a camera mounted on the glasses-type display device; a hand recognizing operation of recognizing a hand of a user from the acquired sequential images; a hand tracking operation of tracking the recognized hand; a hand motion recognizing operation of recognizing a motion of the hand based on a position of the hand acquired in the hand tracking operation; and a control signal outputting operation of outputting a control signal corresponding to the motion of the hand. When the hand is recognized in the hand recognizing operation, the position of the hand is displayed on a screen of the glasses-type display device.

10 Claims, 5 Drawing Sheets

(51) Int. Cl.

| | |
|---|---|
| *G06K 9/00* | (2006.01) |
| *G06F 3/03* | (2006.01) |
| *G06F 3/0482* | (2013.01) |
| *G06F 3/0484* | (2013.01) |
| *G06T 7/20* | (2017.01) |
| *G06F 3/0486* | (2013.01) |

(52) U.S. Cl.
CPC ........ *G06F 3/0486* (2013.01); *G06F 3/04842* (2013.01); *G06K 9/00355* (2013.01); *G06T 7/20* (2013.01); *G06F 2203/0331* (2013.01); *G06F 2203/04806* (2013.01)

(58) Field of Classification Search
CPC ... G06F 2203/0331; G06F 2203/04806; G06F 3/012; G06T 7/20; G06K 9/00355
USPC ........................................................ 345/7–8
See application file for complete search history.

(56) References Cited

U.S. PATENT DOCUMENTS

| | | | | |
|---|---|---|---|---|
| 2008/0266323 | A1* | 10/2008 | Biocca | G06F 3/014 345/633 |
| 2011/0007035 | A1* | 1/2011 | Shai | G06F 3/014 345/179 |
| 2011/0102570 | A1* | 5/2011 | Wilf | G06F 3/017 348/77 |
| 2012/0200494 | A1* | 8/2012 | Perski | G06F 3/017 345/156 |
| 2013/0033571 | A1* | 2/2013 | Steen | G06T 19/20 348/46 |
| 2014/0118570 | A1* | 5/2014 | Chehade | G06K 9/4671 348/222.1 |

* cited by examiner

METHOD BY WHICH EYEGLASS-TYPE DISPLAY DEVICE RECOGNIZES AND INPUTS MOVEMENT

CROSS-REFERENCE TO RELATED APPLICATION

This applications is a continuation of International Application No. PCT/KR2014/007993 filed on Aug. 28, 2014, which claims priority to Korean Application No. 10-2013-0118251 filed Oct. 4, 2013, which applications are incorporated herein by reference.

BACKGROUND

1. Technical Field

The present invention relates to a method by which eyeglass-type display device recognizes and inputs movement, and more specifically, to a method of providing a convenient command inputting method to a glass-type display device by analyzing a user's hand motion moving in front of glasses, which is input from a camera mounted on the glass-type display device to allow a user's hand to function as a mouse device for a computer.

2. Related Art

In recent years, new types of various display devices have emerged. In particular, mobile displays are being developed from smart display devices in which small-computer functions are added to an existing display function, toward wearable displays in which portability is maximized.

For example, since a glass-type display (Google Glass), which has been recently released by Google, is worn as glasses, it is unnecessary to carry the display like an existing smart device. That is, since a head mount display (HMD) is worn as glasses, a bulky display device, such as a TV, is not needed.

Since the glass-type display is close to eyes, the glass-type display is efficient in various aspects, such as portability. However, unlike an existing smart display, it is difficult to use a touch screen as an input device. Thus, a new type of an input device is required. An input device, which has been commonly used until now, can input a command signal by using a voice recognition method, as disclosed in Korean Patent Application Laid-Open No. 10-2001-0012024. However, in the case of the voice recognition method, a malfunction may occur in a loud environment and hearing of other persons is disturbed in a crowded place. Hence, the use of the voice recognition method is limited. Furthermore, in the case of the voice recognition method, it is difficult to input a command signal, such as the movement or drag of a mouse.

Therefore, there is a need to develop a new type of an inputting method that is applicable to a glass-type display device.

SUMMARY OF THE DISCLOSURE

The present invention has been made in an effort to solve the above-described problems and provides a method of performing an input operation through motion recognition in a glasses-type display device, which is capable of controlling the glasses-type display device through the most natural and intuitive hand motion.

According to an embodiment of the present invention, a method of performing an input operation through motion recognition in a glasses-type display device includes: an image acquiring operation of acquiring sequential images by using a camera mounted on the glasses-type display device; a hand recognizing operation of recognizing a hand of a user from the acquired sequential images; a hand tracking operation of tracking the recognized hand; a hand motion recognizing operation of recognizing a motion of the hand based on a position of the hand acquired in the hand tracking operation; and a control signal outputting operation of outputting a control signal corresponding to the motion of the hand, wherein, when the hand is recognized in the hand recognizing operation, the position of the hand is displayed on a screen of the glasses-type display device.

The hand recognizing operation may include recognizing the hand having a predetermined hand shape, the predetermined hand shape including a shape in which an index finger is spread out.

The hand recognizing operation may include: extracting a contour shape of the hand from the acquired sequential images; recognizing whether the extracted contour shape of the hand is a hand shape in which the index finger is spread out; and recognizing whether a direction of hand movement is changed a plurality of number of times from side to side or up and down.

The hand tracking operation may track the position of the hand in a plurality of sequential images that are input after the hand is recognized in the hand recognizing operation, and the hand tracking operation may include: recognizing whether the hand is within a predetermined distance by using information about the position of the hand in a previous image; and tracking the hand by using information about a hand color and a hand shape acquired in the hand recognizing operation.

The image acquired in the image acquiring operation may be displayed on a partial region of a screen of the glasses-type display device, or may be overlaid on the entire screen of the glasses-type display device.

The method may include: extracting an offset value for movement of a background except for the hand through matching between images from the plurality of sequential images acquired in the image acquiring operation; and correcting the position of the hand acquired in the hand tracking operation by using the extracted offset value, so as to correct a change in the position of the hand due to movement of the camera.

The hand motion recognizing operation may include recognizing a motion of bending and spreading out the index finger by analyzing a change in a position of a color code that is attached to an index finger and has a specific color.

The color code may have a ring shape so that the color code is worn on the index finger.

The color code may have a combination of two or more colors.

The hand motion recognizing operation may include: recognizing whether a color code having a specific color is attached to the index finger; when the color code is not attached to the index finger, recognizing a motion in which the index finger has stopped on a menu for a predetermined time, as a click motion; and when the color code is attached to the index finger, recognizing a motion of bending and spreading out the index finger as the click motion.

In the hand motion recognizing operation, a trajectory of the hand that draws a circle clockwise may be interpreted as a zoom-in motion, and a trajectory of the hand that draws a circle counterclockwise may be interpreted as a zoom-out motion.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, a method of performing an input operation through motion recognition in a glasses-type display device according to an embodiment of the present invention will be described with reference to the accompanying drawings.

Figure 1:
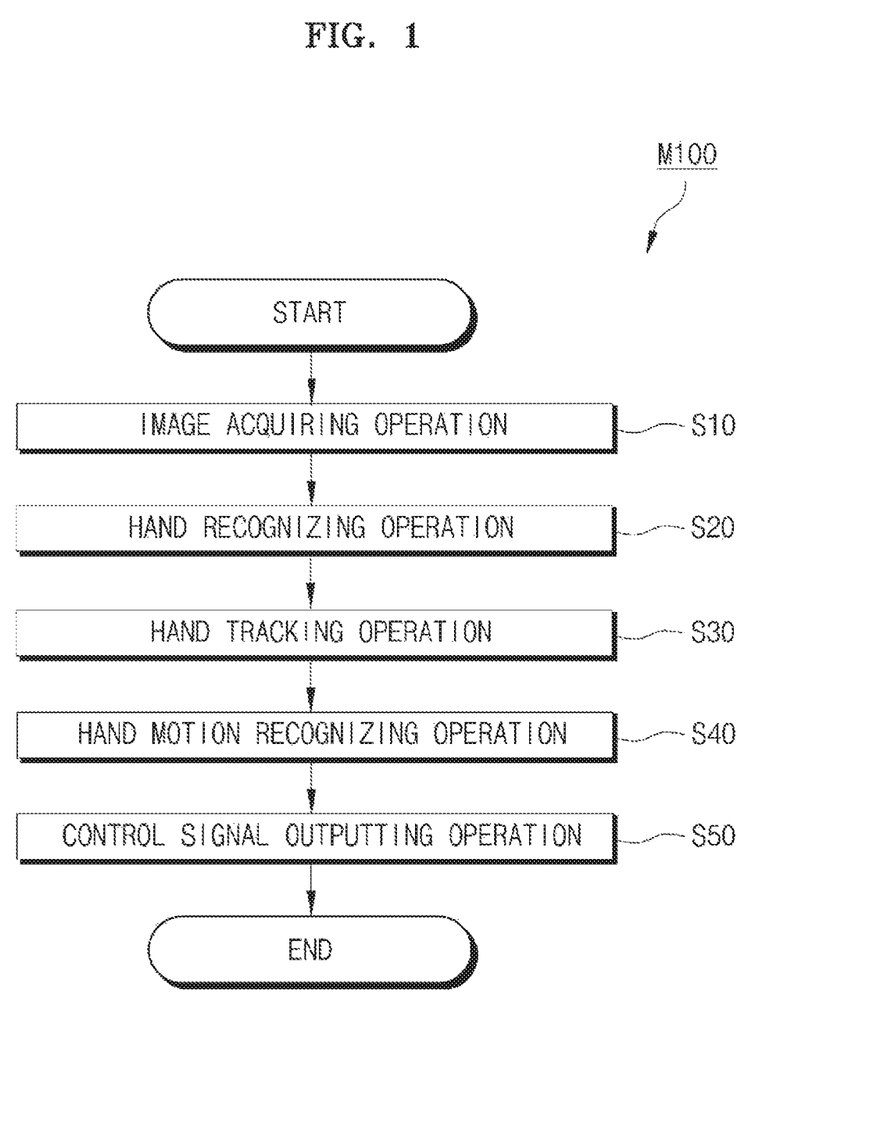
FIG. 1 is a flowchart of a method of performing an input operation through motion recognition in a glasses-type display device according to an embodiment of the present invention.
Figure 2:
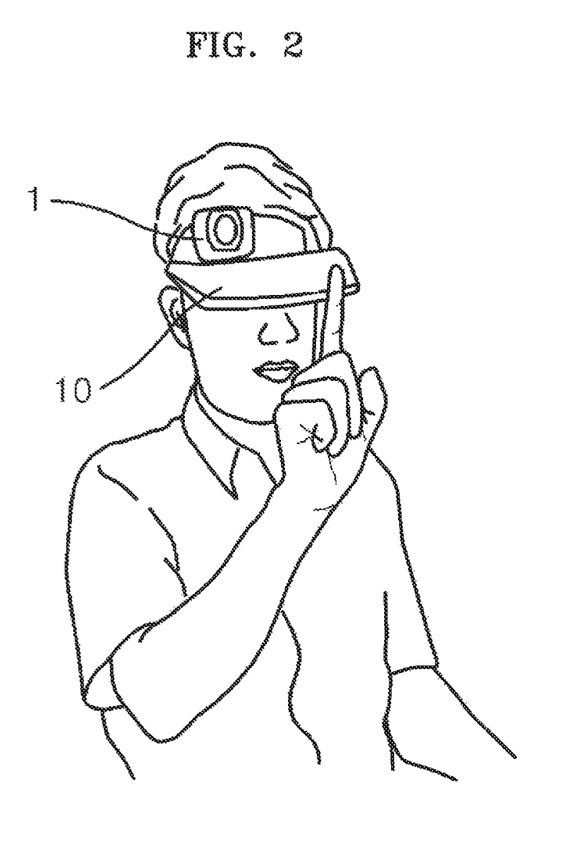
FIG. 2 is a diagram for describing an example of operating the glasses-type display device by using a hand motion.
Figure 3:
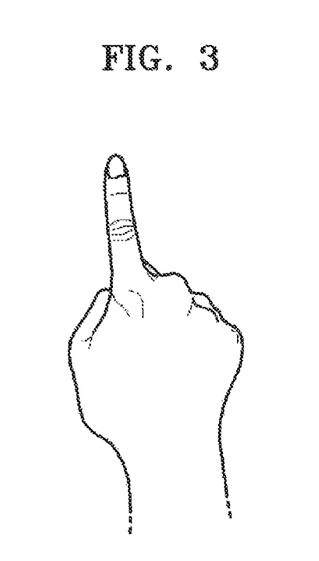
FIG. 3 is a diagram illustrating an index finger that is spread out, as an example of a predetermined hand shape.
Figure 4:
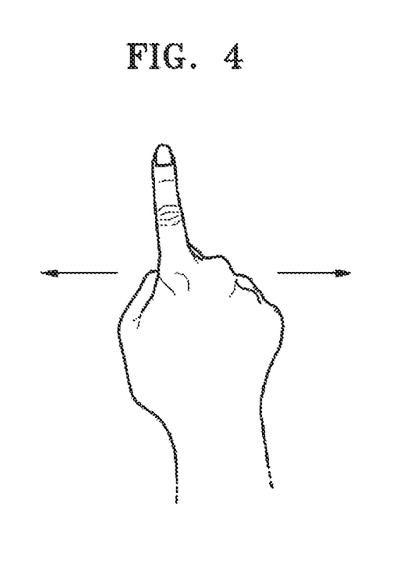
FIG. 4 is a diagram for describing a method of recognizing a hand by moving the hand from side to side.
Figure 5:
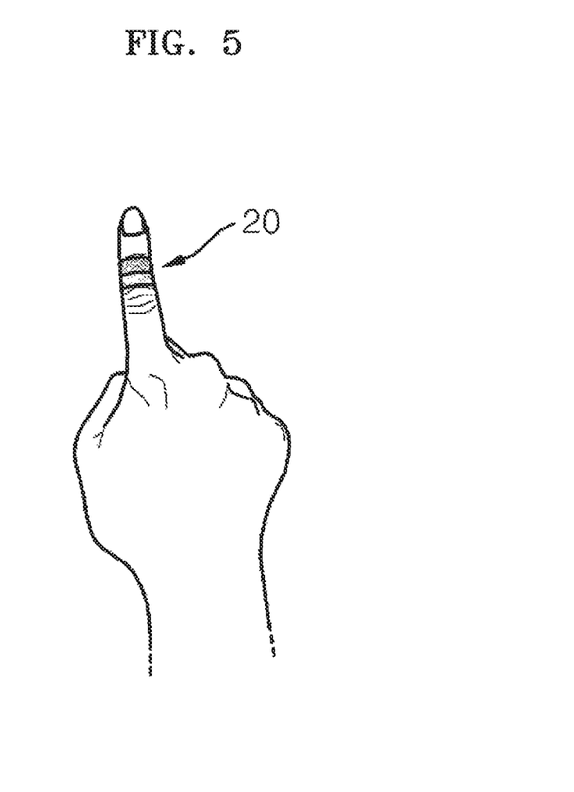
FIG. 5 is a diagram illustrating an example in which a color code is attached to an index finger.
Figure 6:
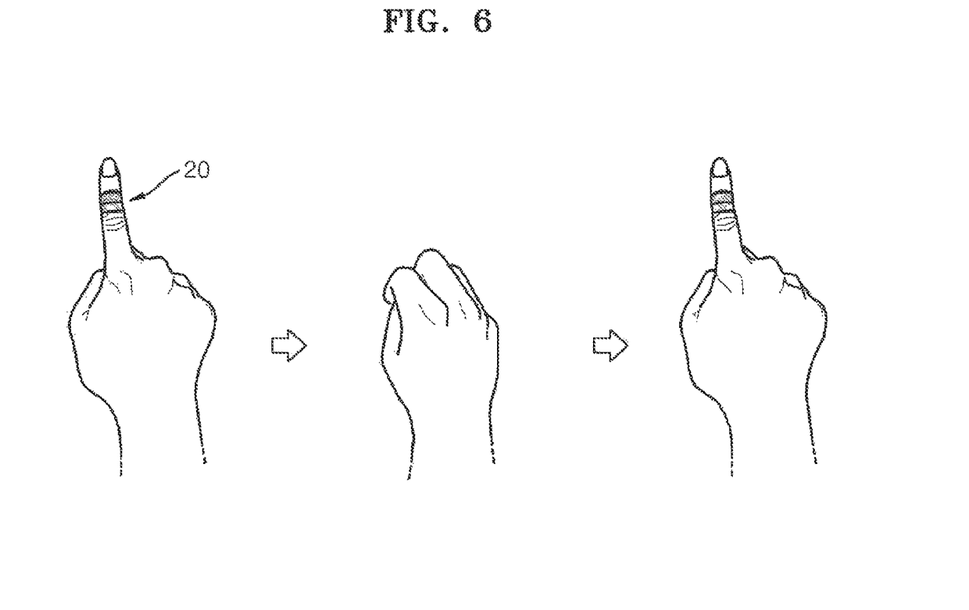
FIG. 6 is a diagram illustrating an example of performing a click operation by bending and spreading out an index finger.
Figure 7:
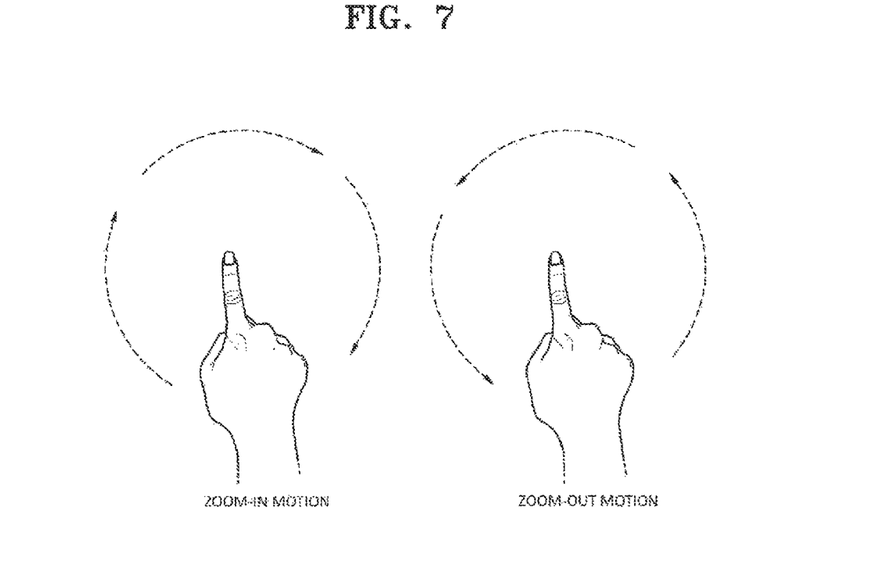
FIG. 7 is a diagram illustrating an example of performing a zoom-in operation and a zoom-out operation by drawing a circle with a finger.

FIG. 1 is a flowchart of a method of performing an input operation through motion recognition in a glasses-type display device according to an embodiment of the present invention. FIG. 2 is a diagram for describing an example of operating the glasses-type display device by using a hand motion. FIG. 3 is a diagram illustrating an index finger that is spread out, as an example of a predetermined hand shape. FIG. 4 is a diagram for describing a method of recognizing a hand by moving the hand from side to side. FIG. 5 is a diagram illustrating an example in which a color code is attached to an index finger. FIG. 6 is a diagram illustrating an example of performing a click operation by bending and spreading out an index finger. FIG. 7 is a diagram illustrating an example of performing a zoom-in operation and a zoom-out operation by drawing a circle with a finger.

Referring to FIGS. 1 to 7, the method M100 of performing the input operation through motion recognition in the glasses-type display device 10 according to the present embodiment includes an image acquiring operation S10, a hand recognizing operation S20, a hand tracking operation S30, a hand motion recognizing operation S40, and a control signal outputting operation S50.

Referring to FIG. 1, the glasses-type display device 10 includes a camera 1 mounted thereon. In the image acquiring operation S10, in a state in which a hand is placed in front of the camera 1, the camera 1 captures and acquires sequential images including the hand.

Most glasses-type display devices are equipped with a two-dimensional (2D) camera. In the case of implementing motion recognition by using a three-dimensional (3D) depth camera, which is a general motion recognition method, it is easy to distinguish the hand and the background ahead, but there is a disadvantage in that the 3D depth camera needs to be additionally mounted. In addition, since the 3D depth camera uses infrared light, it is difficult to operate outdoors on a sunny day. Since a power supply and a size are also important for the glasses-type display device, the method using the 2D camera is more advantageous than the method using the 3D camera.

In the hand recognizing operation S20, a user's hand having a predetermined shape is recognized from the acquired images, and then, a cursor is turned "on" on a screen of the glasses-type display device 10. In the case of using the 2D camera, an image segmentation method of separating the hand and the background ahead becomes important. In a case where the camera is fixed, the hand and the background may be separated from each other by using a difference image between the sequential images. However, in the case of a camera mounted on glasses, the entire input images may be blurred by camera shaking. Therefore, a difference image between the images cannot be used. In addition, in a case where a moving object is present in the background, a difference image cannot be used due to occurrence of other movements, except for a movement of the hand.

According to the present embodiment, in order to solve the above problem, the hand is recognized by recognizing contours (contour lines) of the hand and the background. The contour of the hand may be extracted through image processing of obtaining a contour in an image. A contour image of the hand is analyzed and a predetermined shape of the hand is recognized through image interpretation. In this case, a state in which a user's index hand is spread out as illustrated in FIG. 3 is intuitive because the user's hand blocks a user's front view a little bit and this state is similar to a hand shape when driving the touch screen.

On the other hand, when the hand and the background have similar brightness and colors, a contour boundary capable of distinguishing the hand and the background from each other may not exist. When the contour boundary does not exist, the hand cannot be recognized. According to the present embodiment, in order to solve such a problem, the hand is shaken from side to side (or up and down) as illustrated in FIG. 4. When the hand is shaken, the background changes. Therefore, a probability that the contour boundary will be generated between the hand and the background increases. If the hand can be recognized in N frames among M frames by real-time image processing, it can be regarded as the hand. Also, when the hand is shaken from side to side, the hand can be recognized by counting the number of direction changes. In this way, it is possible to avoid malfunction when a contour boundary similar to the shape of the hand is present in the background.

The hand tracking operation S30 is performed for tracking a position of the hand in a plurality of sequential input images after the hand is recognized in the hand recognizing operation S20. In the hand tracking operation S30, the hand is tracked by using information about the hand recognized in the hand recognizing operation S20, for example, information about the hand color, information about the hand shape, brightness information, or the like. In this case, when tracking a region within a predetermined distance from the position of the hand recognized in a previous image (frame), it is possible to reduce a processing time and a malfunction.

In the hand motion recognizing operation S40, the motion (i.e., movement) of the hand is recognized by analyzing the position of the hand (a change in position) acquired in the hand tracking operation S30.

In the control signal outputting operation S50, a control signal corresponding to the motion of the hand, which is recognized in the hand motion recognizing operation S40, is output.

In order to recognize the hand, the hand needs to be within a captured image. Therefore, it is necessary to inform the user of the position of the hand so as to prevent the hand from deviating from the image captured by the camera. To this end, according to the present embodiment, the image captured by the camera is provided to the user while being displayed on a partial region of the screen in real time or being overlaid on the background of the screen.

Since the camera is mounted on the glasses of the glasses-type display device, the position of the hand is relatively changed when the camera is shaken (for example, the user's head is shaken during walking). Therefore, the position of the hand (cursor position) is shaken, making a precise pointing operation difficult. In order to correct the shaking, shaking in a position value of the hand due to shaking of the camera is corrected by interpreting images input from the camera. That is, an offset value of the movement of the background except for the hand is extracted through matching between images from a plurality of sequential images captured by the camera, and the position of the hand acquired in the hand tracking operation S30 is corrected by using the extracted offset value.

Several specific hand motions (the movement of the hand) and control signals corresponding thereto will be described below in detail.

1. It is possible to make a cursor movement of a mouse by using a position trajectory of the hand in a most common manner.

2. It is necessary to use a specific motion of the hand so as to implement a click operation of a mouse.

As for a first method, when the hand motion is stopped for a predetermined time, it is recognized as a click operation. In this case, the first method can be easily implemented by analyzing position data of the hand. However, in the first method, when there is no movement for the predetermined time while intending no clicking, it may be mistakenly recognized as a click.

As for a second method, a motion of bending and spreading out an index finger is used as a click motion so as to transfer a click command only when a click is intended. In order to distinguish a motion of bending the index finger from a motion of spreading out the index finger, it is necessary to recognize the tip of the index finger. However, it is very difficult to stably recognize the tip of the finger in such a situation that the background changes in various forms. According to the present embodiment, the index finger is stably recognized by attaching a color code 20 to the index finger as illustrated in FIG. 5. The color code 20 may have a specific color and a ring shape so that the color code 20 is easily put into or taken away from the index finger (that is, the color code 20 is attachable and detachable). In this case, in order to increase effectiveness of recognition by differentiating the color code 20 from the surrounding background, the color code 20 may have a special (uncommon color) and easily recognizable color. Furthermore, the color code 20 may have a combination of two or more colors.

As illustrated in FIG. 6, when the color code 20 is attached to the first or second knuckle of the index finger, the color code 20 disappears and appears when the index finger is bended and spread out. Even when the color code 20 does not completely disappear, at least the position of the color code 20 moves up and down. By detecting the movement of the position of the color code 20, it is possible to distinguish a state in which the finger is bended from a state in which the finger is spread out. That is, it is possible to identify a click motion. When a motion of bending the finger is interpreted as a drag motion, it is possible to implement a drag operation.

As for a third method, the two click motions described above are combined. First, it is recognized whether the color code 20 is attached to the index finger. When it is determined that the color code 20 is not attached to the index finger, a motion in which the index finger has stopped on a corresponding menu for a predetermined time may be recognized as the click motion. When the color code 20 is attached to the index finger, a motion of bending and spreading out the index finger may be recognized as the click motion.

3. In the case of viewing a map or a photo, a zoom-in/zoom-out function is needed. In the case of a mobile phone, a pinch-to-zoom method may be used. However, it is difficult to implement the pinch-to-zoom method when the finger moves in the air. The pinch-to-zoom method is to recognize a zoom-in when the index finger and the thumb are pinched apart and a zoom-out when the index finger and the thumb are pinched together, while the index finger and the thumb are placed opposed to each other and touch the mobile phone. When the finger moves in the air, there is no touch operation. Therefore, a zoom-in motion and a zoom-out motion are confused with each other. Therefore, other motions for the zoom-in and the zoom-out are necessary. According to the present embodiment, as illustrated in FIG. 7, a motion of drawing a circle clockwise may be recognized as the zoom-in, and a motion of drawing a circle counterclockwise may be recognized as the zoom-out. The functions can be implemented by interpreting whether the circle is drawn clockwise or counterclockwise through the interpretation of the change in the position of the hand (hand trajectory) acquired in the hand tracking operation S30.

While one or more embodiments have been described with reference to the figures, it will be understood by those of ordinary skill in the art that various changes in form and details may be made therein without departing from the spirit and scope as defined by the following claims.

The invention claimed is:

1. A method of performing an input operation through motion recognition in a glasses-type display device, the method comprising:
    an image acquiring operation of acquiring sequential images by using a camera mounted on the glasses-type display device;
    a hand recognizing operation of recognizing a hand of a user from the acquired sequential images;
    a hand tracking operation of tracking the recognized hand;
    a hand motion recognizing operation of recognizing a motion of the hand based on a position of the hand acquired in the hand tracking operation; and
    a control signal outputting operation of outputting a control signal corresponding to the motion of the hand;
    the method further comprising:
        extracting an offset value for movement of a background except for the hand through matching between images from the plurality of sequential images acquired in the image acquiring operation; and
        correcting the position of the hand acquired in the hand tracking operation by using the extracted offset value, so as to correct a change in the position of the hand due to movement of the camera,
    wherein, when the hand is recognized in the hand recognizing operation, the position of the hand is displayed on a screen of the glasses-type display device.

2. The method of claim 1, wherein the hand recognizing operation comprises recognizing the hand having a predetermined hand shape, the predetermined hand shape including a shape in which an index finger is spread out.

3. The method of claim 2, wherein the hand recognizing operation comprises:
   extracting a contour shape of the hand from the acquired sequential images;
   recognizing whether the extracted contour shape of the hand is a hand shape in which the index finger is spread out; and
   recognizing whether a direction of hand movement is changed a plurality of number of times from side to side or up and down.

4. The method of claim 2, wherein the hand motion recognizing operation comprises recognizing a motion of bending and spreading out the index finger by analyzing a change in a position of a color code that is attached to an index finger and has a specific color.

5. The method of claim 4, wherein the color code has a ring shape so that the color code is worn on the index finger.

6. The method of claim 4, wherein the color code has a combination of two or more colors.

7. The method of claim 2, wherein the hand motion recognizing operation comprises:
   recognizing whether a color code having a specific color is attached to the index finger;
   when the color code is not attached to the index finger, recognizing a motion in which the index finger has stopped on a menu for a predetermined time, as a click motion; and
   when the color code is attached to the index finger, recognizing a motion of bending and spreading out the index finger as the click motion.

8. The method of claim 1, wherein the hand tracking operation tracks the position of the hand in a plurality of sequential images that are input after the hand is recognized in the hand recognizing operation, and
   the hand tracking operation comprises:
      recognizing whether the hand is within a predetermined distance by using information about the position of the hand in a previous image; and
      tracking the hand by using information about a hand color and a hand shape acquired in the hand recognizing operation.

9. The method of claim 1, wherein the image acquired in the image acquiring operation is displayed on a partial region of a screen of the glasses-type display device or is overlaid on the entire screen of the glasses-type display device.

10. The method of claim 1, wherein, in the hand motion recognizing operation, a trajectory of the hand that draws a circle clockwise is interpreted as a zoom-in motion, and a trajectory of the hand that draws a circle counterclockwise is interpreted as a zoom-out motion.

* * * * *